United States Patent [19]

Yoshida

[11] Patent Number: 5,208,681
[45] Date of Patent: May 4, 1993

[54] DATA COMMUNICATION APPARATUS FOR RECEIVING INFORMATION INDICATIVE OF AN AVAILABLE MEMORY AND RECORDING CAPACITY

[75] Inventor: Takehiro Yoshida, Tokyo, Japan

[73] Assignee: Canon Kabushiki Kaisha, Tokyo, Japan

[21] Appl. No.: 639,364

[22] Filed: Jan. 10, 1991

Related U.S. Application Data

[63] Continuation of Ser. No. 165,476, Mar. 8, 1988, abandoned.

[30] Foreign Application Priority Data

Mar. 11, 1987 [JP] Japan .................................. 62-57671

[51] Int. Cl.⁵ .............................................. H04N 1/40
[52] U.S. Cl. ................................... 358/404; 358/444; 358/400; 358/439; 358/434
[58] Field of Search ............... 358/400, 402, 404, 405, 358/407, 438, 449, 401, 406, 434, 435, 436, 437, 439, 443, 444; 374/100

[56] References Cited

U.S. PATENT DOCUMENTS

| | | | |
|---|---|---|---|
| 4,249,216 | 2/1981 | Kanda | 358/257 |
| 4,581,656 | 4/1986 | Wada | 358/257 |
| 4,613,907 | 9/1986 | Yoshimoto | 358/257 |
| 4,631,596 | 12/1986 | Yaguchi | 358/449 |
| 4,672,460 | 6/1987 | Tsuda | 358/256 |
| 4,677,649 | 6/1987 | Kunishi et al. | 358/261.1 |
| 4,679,093 | 7/1987 | Yaguchi | 358/438 |
| 4,695,898 | 9/1987 | Ishikawa | 358/256 |
| 4,704,636 | 11/1987 | Yano | 358/257 |
| 4,712,139 | 12/1987 | Kato | 358/280 |
| 4,717,967 | 1/1988 | Yoshida | 358/280 |
| 4,719,514 | 1/1988 | Kurahayyashi | 358/257 |
| 4,789,900 | 12/1988 | Takahashi | 358/449 |
| 4,811,385 | 3/1989 | Watanabe | 379/100 |

FOREIGN PATENT DOCUMENTS

| | | | |
|---|---|---|---|
| 60-127869A | 12/1983 | Japan | 358/439 |
| 59-122170 | 7/1984 | Japan | 358/404 |

Primary Examiner—Edward L. Coles, Sr.
Assistant Examiner—Jerome Grant
Attorney, Agent, or Firm—Fitzpatrick, Cella, Harper & Scinto

[57] ABSTRACT

A data transmission apparatus includes an NCU for transmitting data, a control circuit for receiving information representing a receivable capacity from a receiver, and a remaining transmissible paper number display circuit for informing a receivable data amount of the receiver on the basis of the information. A data reception apparatus includes an NCU for receiving data, a control circuit for detecting a receivable data amount of the NCU, and a memory control flag, and write and read pointer address memory circuits, these three of which are arranged to transmit information representing the receivable data amount to the transmitter. A method of communicating data is also disclosed.

6 Claims, 7 Drawing Sheets

FIG. 4

| ORIGINAL DOCUMENT SIZE | CODING METHOD | MODE | TRANSMISSION INFORMATION AMOUNT |
|---|---|---|---|
| A 4 | MH | STANDARD | 0.2 M BYTE |
| A 4 | MH | FINE | 0.4 M BYTE |
| A 4 | MR | STANDARD | 0.15 M BYTE |
| A 4 | MR | FINE | 0.3 M BYTE |
| B 4 | MH | STANDARD | 0.3 M BYTE |
| B 4 | MH | FINE | 0.6 M BYTE |
| B 4 | MR | STANDARD | 0.23 M BYTE |
| B 4 | MR | FINE | 0.45 M BYTE |

DATA COMMUNICATION APPARATUS FOR RECEIVING INFORMATION INDICATIVE OF AN AVAILABLE MEMORY AND RECORDING CAPACITY

This application is a continuation of application Ser. No. 07/165,476 filed Mar. 8, 1988, now abandoned.

BACKGROUND OF THE INVENTION

1) Field of the Invention

The present invention relates to a data communication apparatus for performing data communication.

2) Related Background Art

A "memory store" type facsimile system is known as an apparatus of this type wherein received image information is stored in a memory and then image information is printed out on record paper upon complete reception of the image data.

A "memory send" type facsimile machine is also available wherein image data to be transmitted is temporarily stored in a memory, the facsimile machine is then connected to a destination facsimile machine (receiver) through a transmission line, and then the image data is transmitted from the memory. In such an apparatus for performing transmission using a memory, a remaining memory capacity is displayed to allow an operator to decide whether image data to be transmitted can be stored in the memory.

In the conventional facsimile machine, however, the operator at the source (transmitter) side cannot know how many sheets can be received by a receiver side. The operator at the transmitter side cannot know a remaining receivable paper number of the receiver side or a memory (if a memory is used in data communication). Therefore, when a plurality of originals are automatically transmitted, the images of all the originals cannot often be sent to the receiver due to the limited remaining receivable paper number of the receiver side or the memory.

The present applicant filed U.S. Ser. No. 009,071/1987 filed on Jan. 27, 1987 and U.S. Ser. No. 024,521/1987 filed on Mar. 11, 1987 which described arrangements for receiving image information in a memory when record paper is out. The present applicant also filed U.S. Ser. No. 855,704/1986 filed on Apr. 25, 1986, U.S. Ser. No. 911,779/1986 filed on Sep. 26, 1986, U.S. Ser. No. 913,997 filed on Oct. 1, 1986, U.S. Ser. No. 914,652/1986 filed on Oct. 2, 1986, U.S. Ser. No. 150,659/1988 filed on Jan. 13, 1988 and U.S. Ser. No. 134,035/1988 filed on Dec. 17, 1988 which described arrangements for memory reception and/or transmission. The present applicant further filed U.S. Ser. No. 915,430/1986 filed on Oct. 6, 1986 which described an arrangement for informing communication end time.

SUMMARY OF THE INVENTION

It is an object of the present invention to eliminate the conventional problems described above.

It is another object of the present invention to improve a data communication apparatus.

It is still another object of the present invention to inform a transmitter side whether data is receivable in a receiver side;

It is still another object of the present invention to inform the transmitter side prior to data transmission whether data is receivable in the receiver side.

It is still another object of the present invention to inform the transmitter side of a receivable data amount.

It is still another object of the present invention to inform the transmitter side prior to data transmission whether all data can be received by the receiver side.

It is still another object of the present invention to allow an operator at the transmitter side to identify a receivable data amount of the receiver side.

The above and other objects, features, and advantages of the present invention will be apparent from the following detailed description of preferred embodiments in conjunction with the accompanying drawings.

BRIEF DESCRIPTION OF THE DRAWINGS

FIG. 4 is a view showing transmission data amounts respectively corresponding to different transmission conditions;

DETAILED DESCRIPTION OF THE PREFERRED EMBODIMENTS

Preferred embodiments of the present invention will be described with reference to the accompanying drawings.

Figure 1:
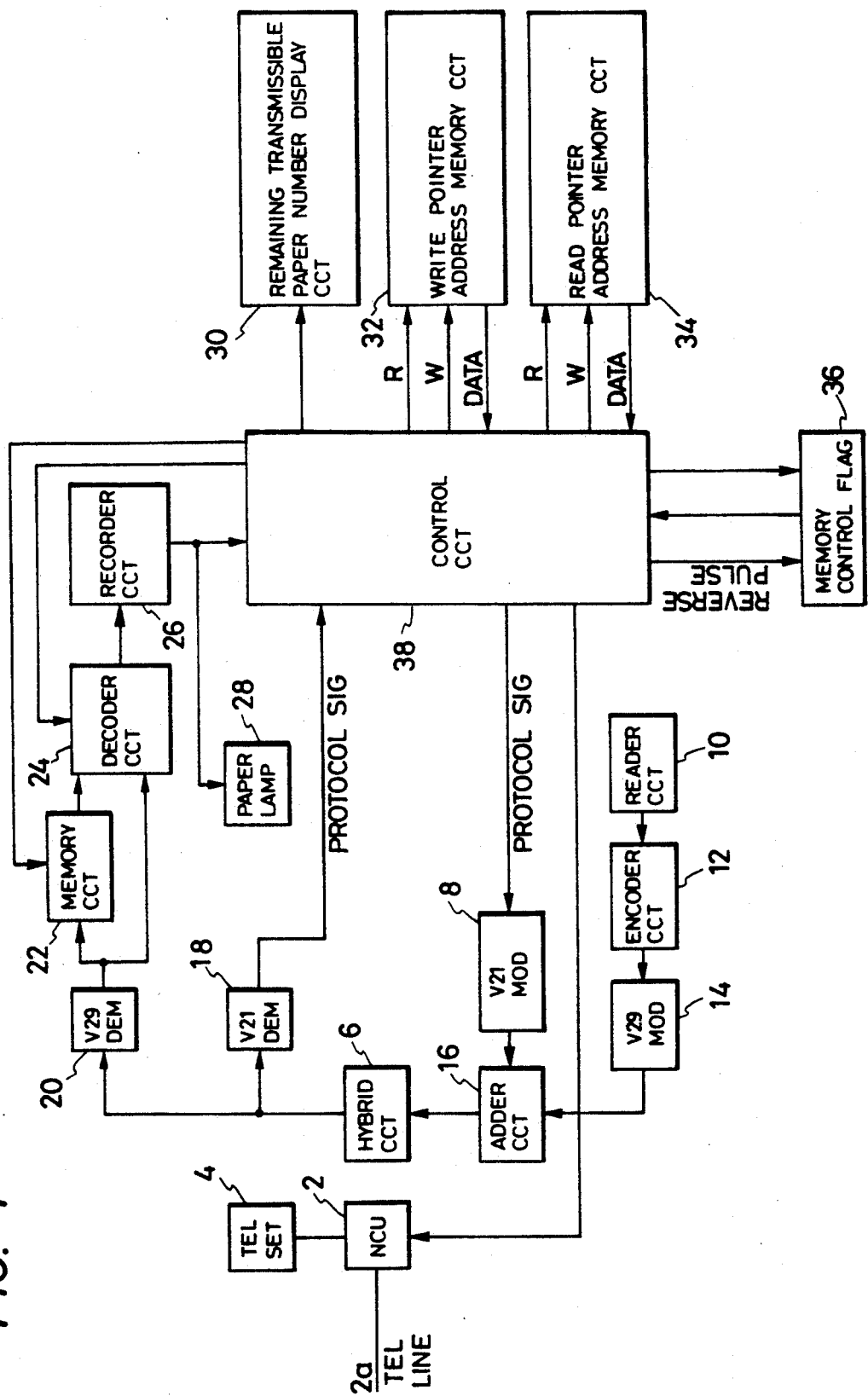
FIG. 1 is a block diagram showing an arrangement according to a first embodiment of the present invention.

FIG. 1 is a block diagram showing an arrangement according to a first embodiment of the present invention.

An NCU (network control unit) 2 is a control unit connected to a terminal of a telephone line 2a to perform connection control of a telephone network, engage/disengage a telephone set with/from the telephone line 2a, and hold a communication loop. The NCU 2 connects the telephone line 2a to a telephone set 4 or a facsimile machine in accordance with a level of a signal from a control circuit 38. In a normal operating state, the telephone line 2a is connected to the telephone set 4.

A hybrid circuit 6 separates a transmission signal from a reception signal. A modulator 8 performs modulations on the basis of a known CCITT recommendation V21. A reader circuit 10 scans a transmission original image, sequentially reads main scanning line image signals line by line, and generates a binary (black and white) signal train. The reader circuit 10 comprises an image pickup device such as a CCD (charge-coupled device) and an optical system. An encoder circuit 12 encodes the binary data in accordance with an MH (modified Huffman) or MR (modified READ) coding method. A modulator 14 performs modulation on the basis of a known CCITT recommendation V27ter (differential phase modulation) or V29 (orthogonal modulation).

The data communication apparatus also includes an adder circuit 16, a demodulator 18 for performing demodulation on the basis of a known CCITT recommendation V21, a demodulator 20 for performing demodulation on the basis of the known CCITT recommendation V27ter (differential phase modulation) or V29 (orthogonal modulation), a memory circuit 22, a decoder circuit 24, and a recorder circuit 26.

Data can be accessed from a memory location in the memory circuit 22 in response to an address pointer from the control circuit 38. The decoder circuit 24 decodes the demodulated data from the demodulator 20 or data from the memory circuit 22. If a signal from the control circuit 38 to the decoder circuit 24 is set at logic "0", the decoder circuit 24 decodes the signal from the demodulator 20. However, if the signal is set at logic "1", the decoder circuit 24 decodes the data from the memory circuit 22. The decoder circuit 24 employs the MH (modified Huffman) or MR (modified READ) decoding method.

The recorder circuit 26 sequentially records decoded one-line data. A black band as a near end mark is marked on the lower surface of the record paper. The near end mark has a length (black band length) of, e.g., 50 cm. The recorder circuit 26 outputs a signal of logic "1" when it detects the near end mark. Otherwise, the recorder circuit 26 outputs a signal of logic "0".

The data communication system according to this embodiment further includes a lamp 28 for indicating the presence of record paper, a remaining transmissible paper number display circuit 30, and a write pointer address memory circuit 32 for recording address pointers used when the demodulated data from the demodulator 20 is written in the memory circuit 22.

When the write pointer address memory circuit 32 receives a write/read pulse from the control circuit 38, the memory circuit 32 performs write pointer address write/read access. A read pointer address memory circuit 34 stores read pointer addresses used for reading out data from the memory circuit 22. When the memory circuit 34 receives a write/read pulse from the control circuit 38, the memory circuit 34 performs read pointer address write/read access.

A memory control flag 36 is set when the write pointer of the memory circuit 22 is returned from the end address to the start address. The memory control flag 36 is reset when the read pointer is returned from the end address to the start address of the memory circuit 22. When the memory control flag 36 receives a reverse pulse from the control circuit 38, the memory control flag 36 reverses the content of the flag.

The control circuit 38 always monitors a remaining capacity of the memory in the receiver side and displays a remaining receivable paper number in the transmitter and receiver in accordance with transmission conditions. The transmission conditions are an information size (i.e., an original document size), a coding method, and a line density (i.e., a transmission information amount).

The operation of the data communication apparatus having the arrangement described above will be described below.

The receiver in the above embodiment performs recording on record paper until the near end mark is detected. When the near end mark is detected at the start of one page, subsequent data is stored in the memory circuit 22. When the near end mark is detected during reception of one-page data, the data of this page is recorded on the record paper.

In the receiver, assume that its memory capacity is, e.g., 10 Mbytes, that original document sizes to be transmitted are A4 and A5, that coding methods are MH and MR coding methods, that the line densities are defined by a standard mode (i.e., the line density in the subscanning direction is 3.85 lines/mm) and a fine mode (i.e., the line density in the subscanning direction is 7.7 lines/mm), and that the line density in the main scanning direction is 8 lines/mm.

If a transmission original document having an A4 size is transmitted in the standard mode in accordance with the MH coding method, a standard amount of coded information is, e.g., 0.2 Mbytes. If a transmission original document having an A4 size is transmitted in the fine mode in accordance with the MH coding method, a standard amount of coded information is, e.g., 0.4 Mbytes.

Standard amounts of coded information according to combinations of original document sizes, coding methods, and modes are shown in FIG. 4.

The receiver in this embodiment always monitors the remaining receivable capacity and calculates a remaining receivable paper number by dividing the remaining receivable capacity by a standard information amount obtained by encoding the data in accordance with the information size, the coding method, and the line density (standard mode, fine mode or the like) of current transmission. Every time one-page transmission is completed, the remaining receivable paper number is informed using an MCF (message confirmation signal) and a CFR (reception preparation confirmation signal). By displaying the remaining paper number in the reception and transmission facsimile machines, the operator can accurately check the remaining transmissible paper number.

Figure 2:
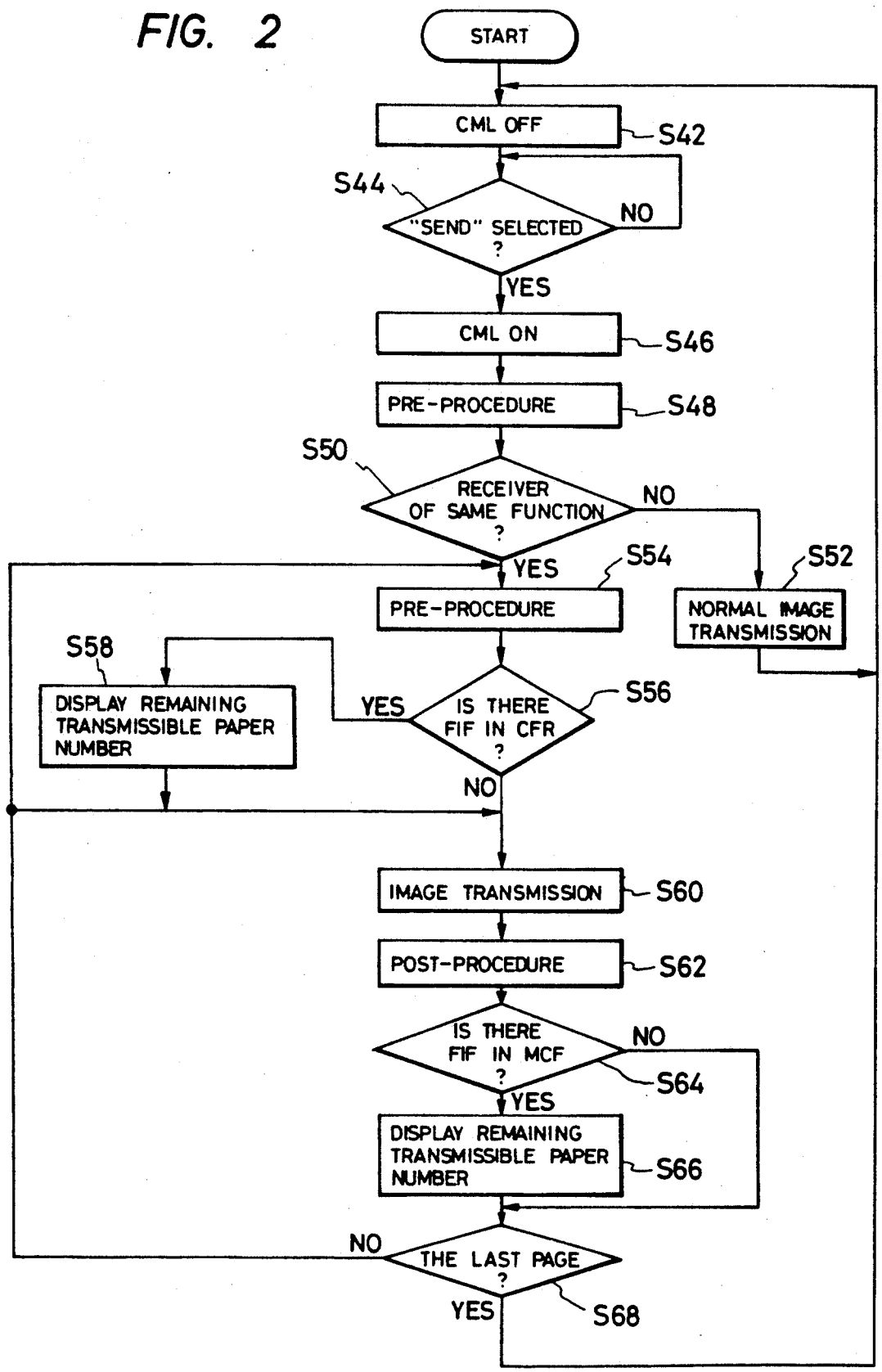
FIG. 2 is a flow chart showing a control operation of a control circuit 38 in a transmitter facsimile side in the first embodiment.

FIG. 2 is a flow chart for explaining the operation of the control circuit 38 in the transmitter (source facsimile machine) in the above embodiment.

The control circuit 38 sends a signal of logic "0" to the NCU 2 to set a CML to be OFF; however, if the "send" mode is selected (steps S42 and S44), the control circuit 38 sends a signal of logic "1" to the NCU 2, thereby setting the CML to be ON (step S46). The pre-procedure is then performed (step S48) to determine that the receiver has the same function as that of the transmitter (step S50). If NO in step S52, normal image transmission is performed.

However, if YES in step S52, the pre-procedure is performed (step S54). If an FIF (facsimile information field) is set in the CFR, the remaining transmissible paper number is displayed on the display circuit 30 (steps S56 and S58). However, if the FIF is not set in the CFR, image transmission is performed and the post-procedure is then performed (steps S60 and S62).

If the FIF is present in the MCF (step S64), the remaining transmissible paper number is displayed on the display circuit 30 (step S66), and the above operations (steps S42 to S66) are performed (step S68).

Figure 3:
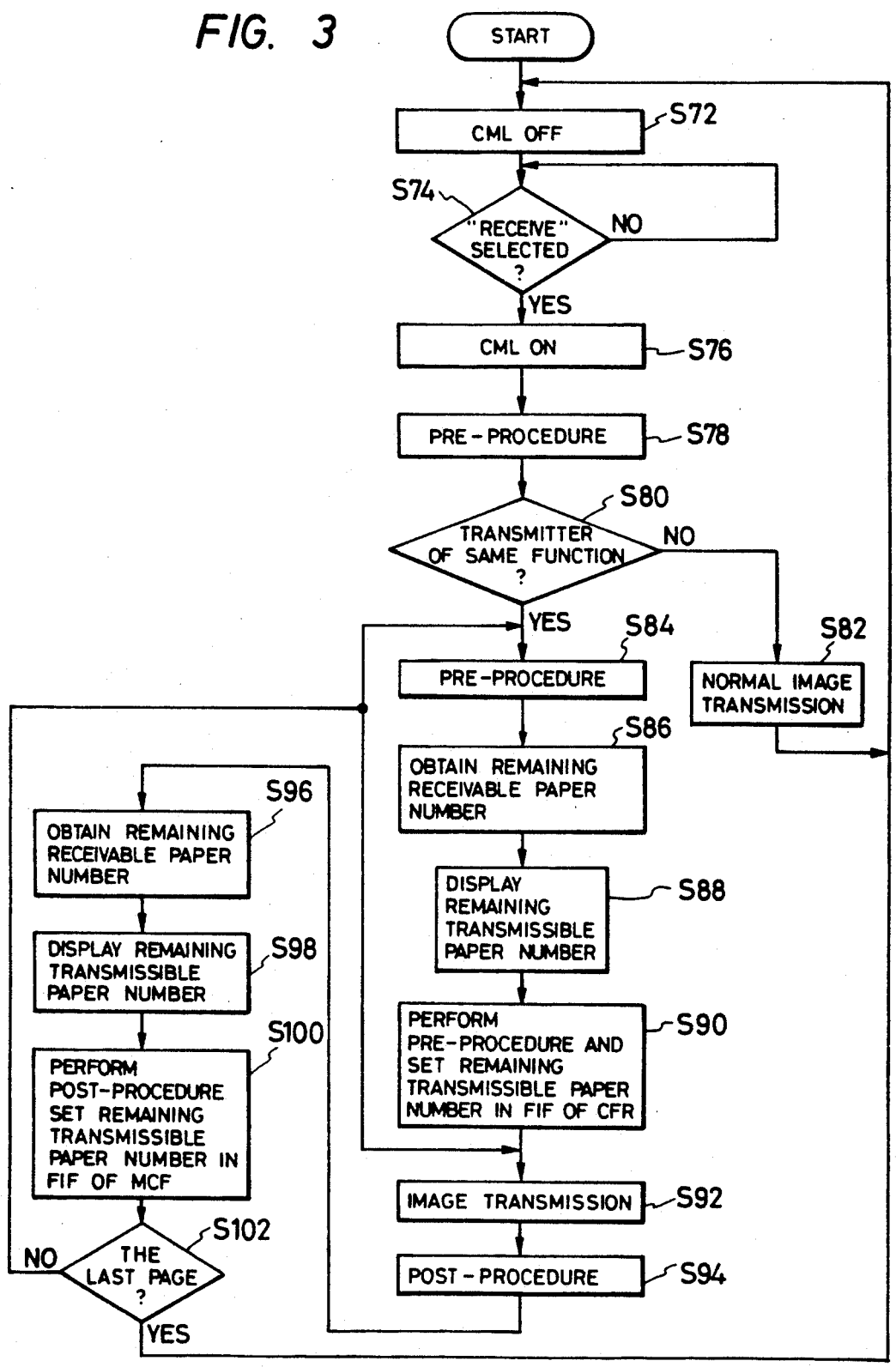
FIG. 3 is a flow chart for explaining a control operation of a control circuit 38 in a receiver facsimile side in the first embodiment.

FIG. 3 is a flow chart showing an operation of the control circuit 38 of the receiver in the above embodiment.

The control circuit 38 sends a signal of logic "0" to the NCU 2 to turn off the CML. If the "receive" mode is selected (steps S72 and S74), the control circuit 38 sends a signal of logic "1" to the NCU 2 to turn on the CML and the pre-procedure is performed (steps S76 and S78). If the transmitter does not have the same function as that of the receiver, normal image transmission is performed (steps S80 and S82).

If the transmitter has the same function as the receiver, the pre-procedure is performed (step S84) and a remaining receivable paper number is calculated (step S86). The remaining transmissible paper number is displayed on the display circuit 30 (step S88). The receivable amount is divided by the memory capacity obtained by encoding one page in accordance with the present transmission mode to obtain a remaining receivable paper number. The transmission mode conditions are the original document size (A4 or B4), the coding method (MH or MR), and the subscanning mode (standard or fine mode).

The remaining receivable memory capacity is calculated on the basis of a write pointer address, a read pointer address, and the memory control flag 36. The pre-procedure is then performed and the remaining transmissible paper number is set in the FIF in the CFR (step S90). Image transmission is performed and finally the post-procedure is performed (steps S92 and S94). The remaining receivable paper number is calculated in the same manner as in step S86 (step S96), and the remaining transmissible paper number is displayed (step S98). The remaining transmissible paper number is set in the FIF in the same manner as in step S90 (step S100). It is then determined by an EOP (end-of-page signal) in step S102 whether the current page is the last page. If YES in step S102, the flow returns to step S72. If the current page is determined not to be the last page as in the case wherein an MPS (multi-page signal) is received and if a mode change is not detected, the flow returns to step S92. Note that the flow returns to S84 if the current page is determined not to be the last page after reception of an EOM (end-of-message signal) and the mode change is detected.

In the pre-procedure, when the transmitter receives the remaining receivable capacity information from the receiver, the transmitter may calculate a remaining receivable paper number on the basis of the information size, the coding method, the line density, and the like of current transmission. The remaining receivable paper number may be displayed.

When a plurality of pages are to be received, an information amount of the received coded data of the first page may be counted, and the remaining transmissible capacity may be divided by the received coded data of the first page to obtain a remaining transmissible paper number. Similarly, when a plurality of pages are to be received, an information amount of the received coded data of the immediately preceding page, an average value of all the received coded data information amounts may be counted, and a remaining transmissible paper number may be calculated on these numbers because coded information amounts of the respective pages constituting one document are often substantially identical.

In the above embodiment, the receivable paper number is displayed in the memory "receive" mode. However, a receivable paper number may be displayed at the transmitter side when information is recorded on the normal record paper.

A second embodiment of the present invention will be described below. The arrangement of the facsimile machine is the same as that of FIG. 1. However, the control operation of a control circuit 38 is different from that of FIG. 1.

In the second embodiment, a receivable information amount is informed from the receiver, and a transmissible paper number in the given transmission mode defined by the size and the mode prior to transmission is displayed on the transmitter side. The operator can know beforehand whether information to be transmitted can be entirely sent.

Reception modes of the receiver are a memory reception mode, a mode for causing a memory to store information if record paper is out, a mode for recording information on record paper and continuing recording using a memory after the record paper is out, and a mode for recording information on only record paper.

Figure 5:
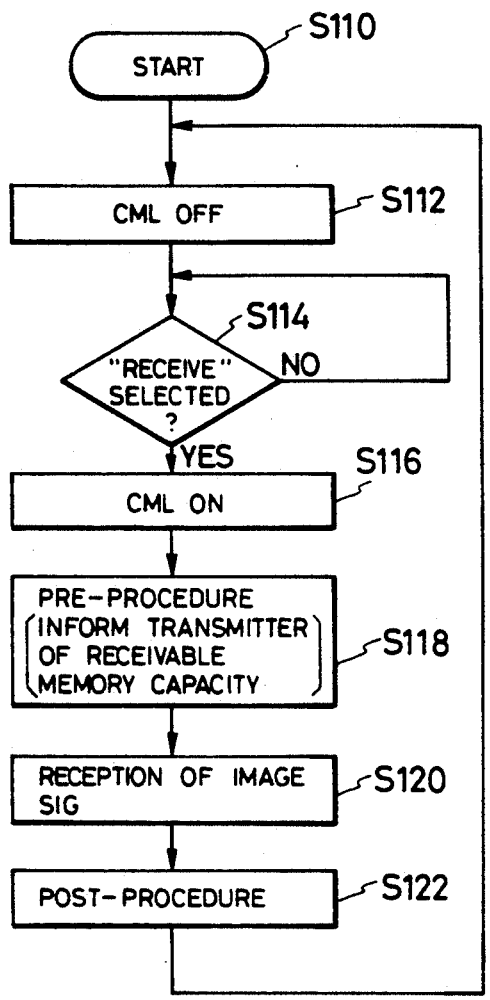
FIG. 5 is a flow chart for explaining a control operation in the receiver side in a memory "receive" mode in a second embodiment.

FIG. 5 is a flow chart for explaining a control operation of the control circuit when the receiver is set in the memory "receive" mode.

The control circuit 38 sends a signal of logic "0" to the NCU 2 to set the CML to be OFF (step S112). It is determined in step S114 whether the "receive" mode is selected. If YES in step S112, the control circuit 38 sends a signal of logic "1" to the NCU 2 to set the CML to be ON (step S116), and the pre-procedure is performed (step S118). In this pre-procedure, a receivable memory capacity is informed using a nonstandard signal, i.e., an NSF signal. In step S120, image signal is received. In step S122, the post-procedure of facsimile communication is performed.

Figure 6:
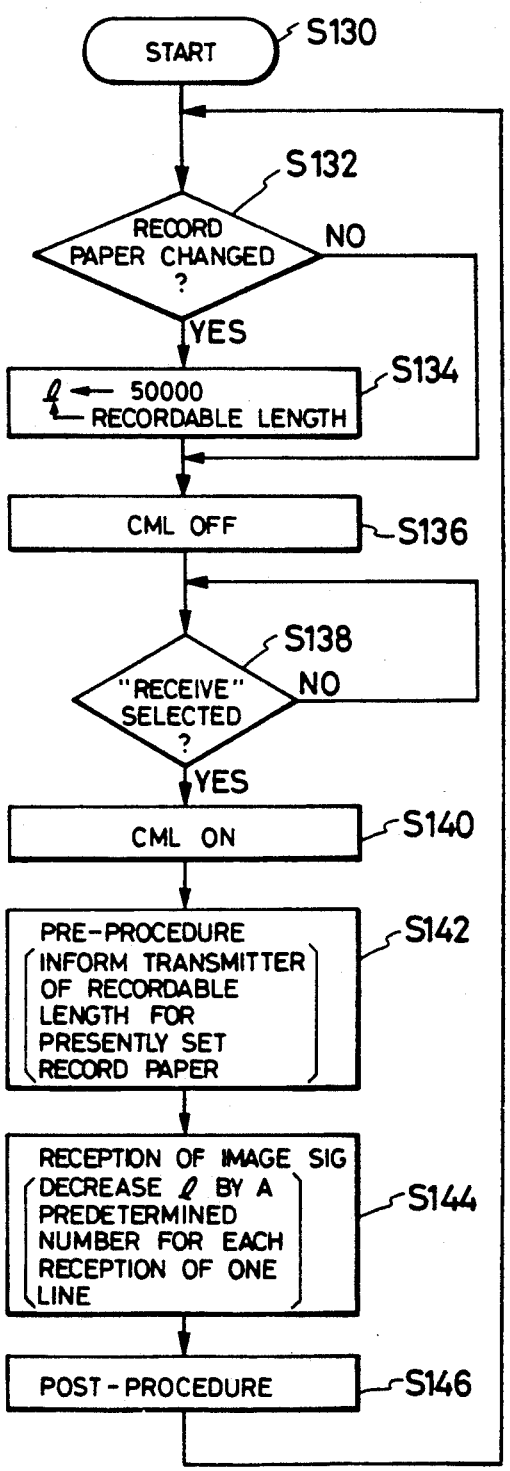
FIG. 6 is a flow chart for explaining a control operation in the receiver side in the record paper "receive" mode.

FIG. 6 is a flow chart for explaining a control operation of the control circuit 38 when information is received and recorded on record paper.

When a record paper roll is replaced with a new one, a recordable length is set to be 50 m (since the unit is defined in mm, 50,000 is set in l) in step S134. Record paper replacement may be automatically detected by the facsimile machine. After the record paper is replaced with the new one, an operator may depress a predetermined button to cause the facsimile machine to detect this replacement.

The control circuit 38 sends a signal of logic "0" to the NCU 2 to set the CML to be OFF (step S136). It is determined in step S138 whether the "receive" mode is selected. If YES in step S138, the control circuit 38 sends a signal of logic "1" to the NCU 2 to set the CML to be ON (step S140), and the pre-procedure is performed (step S142) so as to inform the transmitter of a recordable lengths for presently set record paper using a nonstandard signal, i.e., an NSF signal. In step S144, reception of the image signal is performed. The recordable length l is decreased by a predetermined number for each reception of one line. For example, when reception in the standard mode is performed, the predetermined number is 1/3.85. In the fine mode, the predetermined number is 1/7.7. In step S146, the post-procedure is performed.

When information is received and stored in a memory after record paper is out, a combination of the flow charts of FIGS. 5 and 6 can be used, and a detailed description thereof will be omitted.

Figure 7:
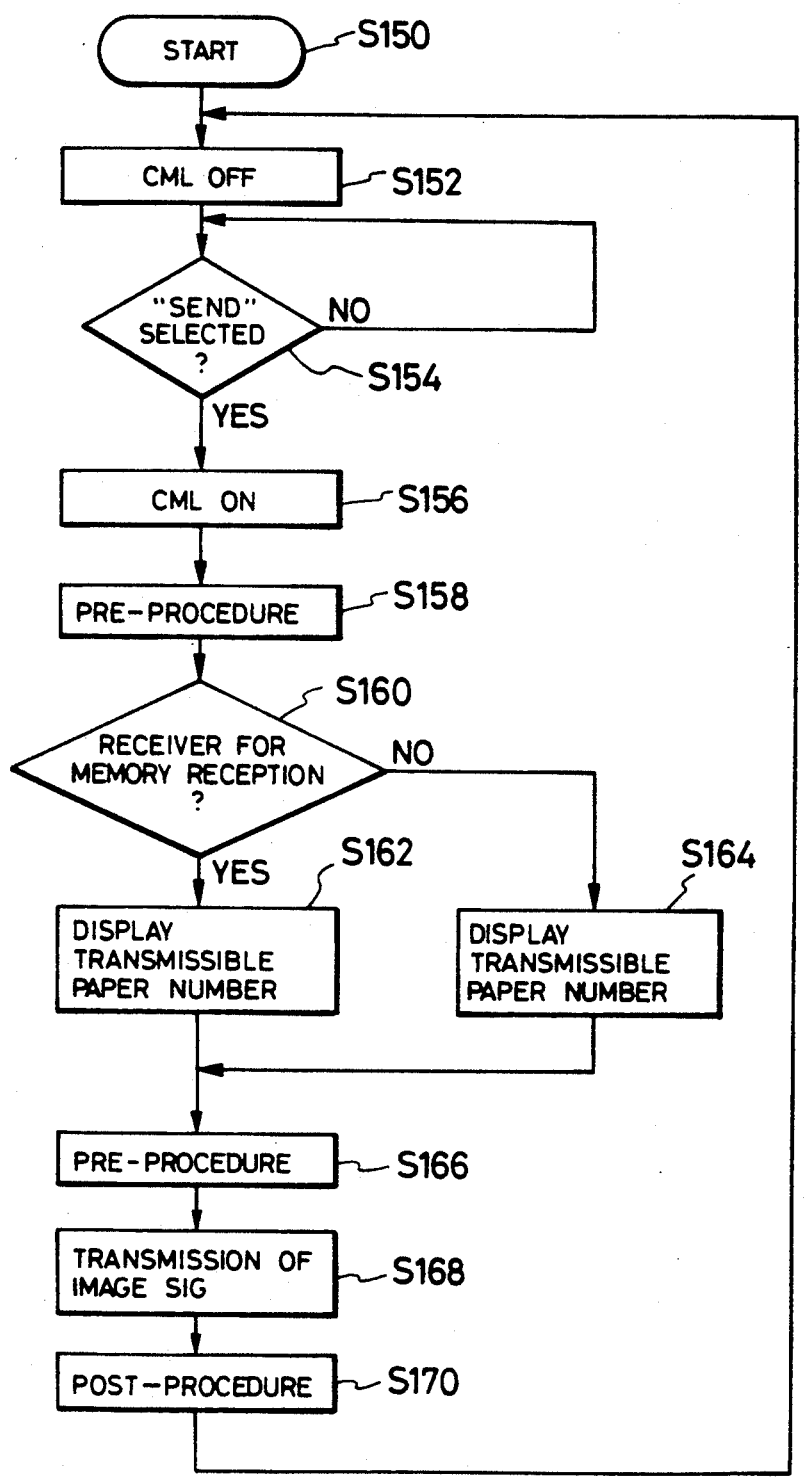
FIGS. 7 and 8 are flow charts for explaining control operations in the transmitter side.

When the receiver informs the transmitter of the receivable information amount from the receiver, the transmitter displays a transmissible paper number in the operation determined by the original document size and the mode (standard or fine mode). More specifically, the transmitter displays the receivable paper number at a timing for generating the NSS/TSI/DCS signal. FIG. 7 is a flow chart for explaining a control operation of the control circuit 38 in the transmitter.

Referring to FIG. 7, the control circuit 38 sends a signal of logic "0" to the NCU 2 to set the CML to be OFF (step S152). It is then checked in step S154 whether the "send" mode is selected. If YES in step S154, the control circuit 38 sends a signal of logic "1" to the NCU 2 to set the CML to be ON (step S156). In step S158, the pre-procedure is performed. In the pre-procedure, it is checked if the receiver is set in the memory "receive" mode. If YES in the pre-procedure, the flow advances to step S162. In step S162, the receivable memory capacity is divided by a one-page memory capacity determined in the presently set original document size and transmission mode to calculate a transmissible paper number. The transmissible paper number is displayed at a timing for transmitting the NSS/TSI/DCS signal.

When the receiver does not have a function for receiving and storing information in a memory when record paper is out, so that information is recorded on only recording paper, the flow advances to step S164. The receivable length is divided by the subscanning length of the presently set original document size to obtain a transmissible paper number. The transmissible paper number is displayed at a timing for transmitting the NSS/TSI/DCS signal. In other words, the receivable paper number can be displayed prior to actual image transmission.

The remaining pre-procedure is performed in step S166, and transmission of the image signal is performed in step S168. Finally, the post-procedure is performed in step S170.

In the transmitter, original sheets to be transmitted are automatically set by a sorter or the like, or manually set by the operator. The number of original sheets is compared with the receivable paper number. In this manner, it may be determined whether all original sheets can be transmitted or not.

Figure 8:
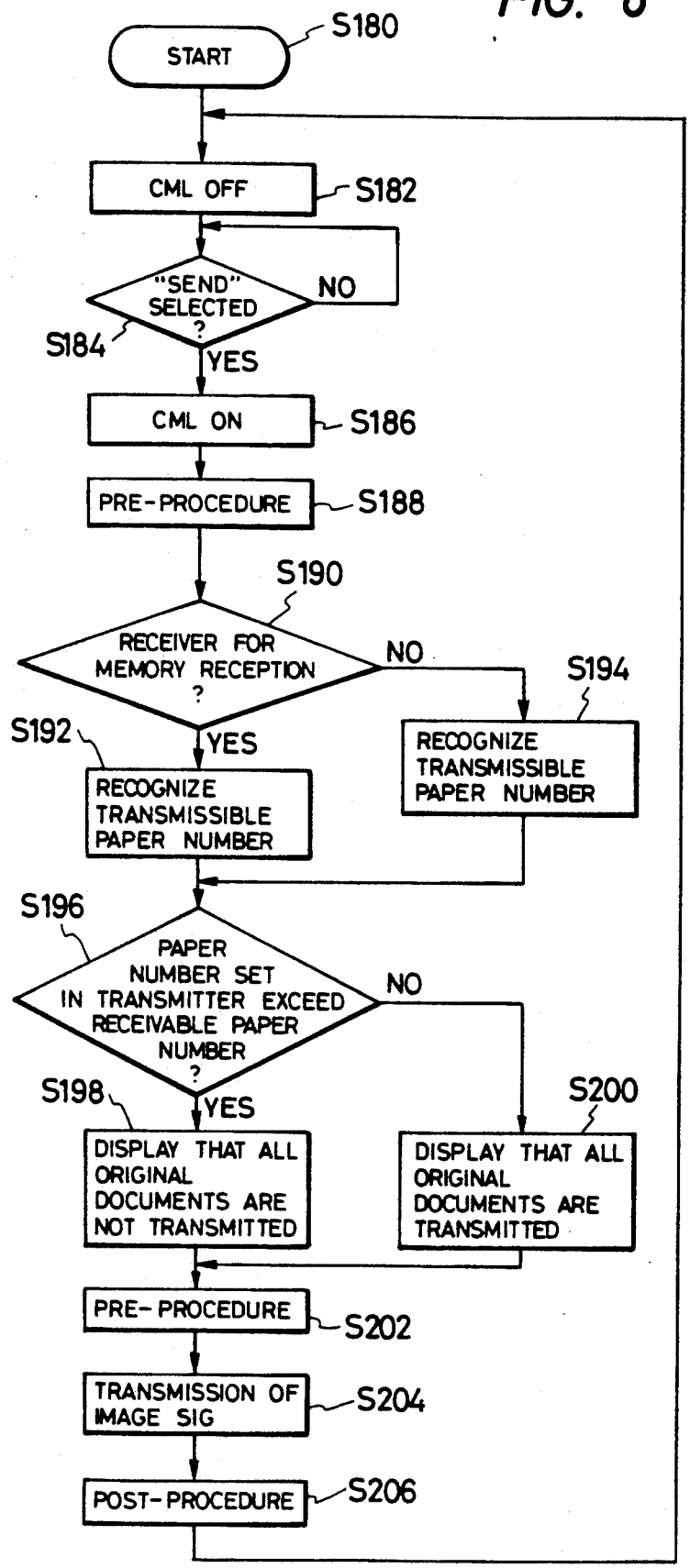

FIG. 8 is a flow chart for explaining a control operation of the control circuit 38 when information is displayed whether all original images are receivable.

Referring to FIG. 8, the control circuit 38 sends a signal of logic "0" to the NCU 2 to set the CML to be OFF (step S182). It is determined in step S184 whether the "send" mode is set. If YES in step S184, the control circuit 38 sends a signal of logic "1" to the NCU 2 to set the CML to be ON (step S186). In step S188, the pre-procedure is performed. It is then determined in step S190 whether the memory "receive" mode is set. If the receiver is set in the memory "receive" mode, the flow advances to step S192 and the receivable memory capacity is divided by a one-page memory capacity defined by the presently set original document size and transmission mode to obtain a transmissible paper number.

If the receiver does not have a function for receiving information in a memory when record paper is out so that information is recorded on only record paper, the flow advances to step S194. The receivable length is divided by the subscanning length of the presently set original document size to obtain a transmissible paper number.

It is determined in step S196 whether the paper number presently set in the transmitter exceeds the transmissible paper number. If YES in step S196, a message "All originals cannot be transmitted" is displayed at a timing for generating the NSS/TSI/DCS signal (step S198). However, if NO in step S196, a message "All originals can be transmitted" is displayed at the timing for generating the NSS/TSI/DCS signal (step S200).

In step S202, the remaining pre-procedure is performed. In step S204, transmission of the image signal is performed. In step S206, the post-procedure is performed.

In addition to the embodiments described above, display for representing whether all information can be transmitted may be performed in place of remaining memory capacity display.

Furthermore, the transmitter may inform the receiver of the transmissible information amount and may receive from the receiver information representing whether all information can be transmitted.

In the above embodiments, the facsimile machine is exemplified. However, the present invention is also applicable to coded data communication apparatuses such as a teletext, a telex, and a wordprocessor.

Various changes and modifications may be made within the spirit and scope of the invention.

What is claimed is:

1. A data transmission apparatus comprising:
   transmitting means for transmitting data;
   means for receiving information representing a receivable capacity from a receiver; and
   means for informing a receivable data amount of said receiver on the basis of the information,
   wherein the information representing the receivable capacity comprises information representing a memory capacity of said receiver,
   wherein the transmission data is image data, and wherein said informing means displays a receivable paper number of the basis of a unit transmission data amount and the information of the memory capacity in said receiver, and
   wherein said informing means comprises a table memory for storing information of a one-page transmission data amount corresponding to image data size information and a coding method and displays the receivable paper number on the basis of the unit transmission data amount and the memory capacity information of said receiver.

2. An apparatus according to claim 1, wherein said table memory stores information of one-page transmission data amount corresponding to image data size information, a coding method and a pixel density.

3. A data transmission apparatus comprising:
   transmitting means for transmitting image data;
   means for receiving information representing a receivable capacity, which comprises information representing a memory capacity, from a receiver;
   a table memory for storing information of a one-page transmission data amount corresponding to image data size information and a pixel density of image data; and
   means for displaying a receivable paper number on the basis of the unit transmission data amount and the memory capacity information from said receiver.

4. An apparatus according to claim 3, wherein said table memory stores information of one-page transmission data amount corresponding to image data size information, a coding method and a pixel density.

5. A method of communicating data, comprising the steps of:
   receiving information representing a receivable capacity, which comprises information representing a memory capacity, from a receiver;

referring to a table memory in accordance with a size of image data to be transmitted and a pixel density when the image data is transmitted, wherein the table memory has stored information of a one-page transmission data amount corresponding to image data size information and a pixel density of the image data, and displaying a receivable paper number on the basis of the unit transmission data amount from the table memory and the memory capacity information from the receiver.

6. A method according to claim 5, wherein the table memory has stored information of a one-page transmission data amount corresponding to image data size information, a pixel density of image data and a coding method, and wherein said referring step is executed in accordance with a size of image data to be transmitted and a pixel density.

* * * * *